Feb. 15, 1927. 1,618,146
H. BUEL
MACHINE FOR FORMING PRODUCTS FROM PULPY MASS
Filed July 17, 1917   3 Sheets-Sheet 3

INVENTOR
BY
ATTORNEYS

Patented Feb. 15, 1927.

1,618,146

UNITED STATES PATENT OFFICE.

HILLHOUSE BUEL, OF SEATTLE, WASHINGTON, ASSIGNOR OF ONE-HALF TO WILLIAM P. HAMMOND, OF SCARSDALE, NEW YORK.

MACHINE FOR FORMING PRODUCTS FROM PULPY MASS.

Application filed July 17, 1917. Serial No. 180,979.

My invention briefly described consists of a machine for forming articles of various shapes out of a pulpy mass by flowing the pulpy mass under super-atmospheric pressure against a foraminous mold surface or wall, in such a way that the liquid content of the pulpy mass will flow through the foraminous wall leaving the solid content adhering to the inner surface of the mold, thus forming the article to be made. In the preferred embodiment of my improved machine, I provide a mold the foraminous walls of which are made in sections. I further provide means operating successively and automatically to force the pulpy mass into the mold, to drain away the liquid content, to force air or other gaseous drying medium, preferably heated and under super-atmospheric pressure, into the mold in order to dry and compact the pulpy material adhering to the wall, to inject a coating or filling material, such as paraffin, into the mold to coat and size the article, to open the mold, remove the finished article, and repeat this cycle of operations continuously, automatically, and at a comparatively high speed.

In the drawing accompanying and forming a part of this specification, I have illustrated the preferred embodiment of my invention as applied to the manufacture of hollow containers, such as milk bottles, and my invention and its application to the manufacture of other articles will readily be understood from a description of this preferred embodiment.

Referring to the drawing.

Figure 1:
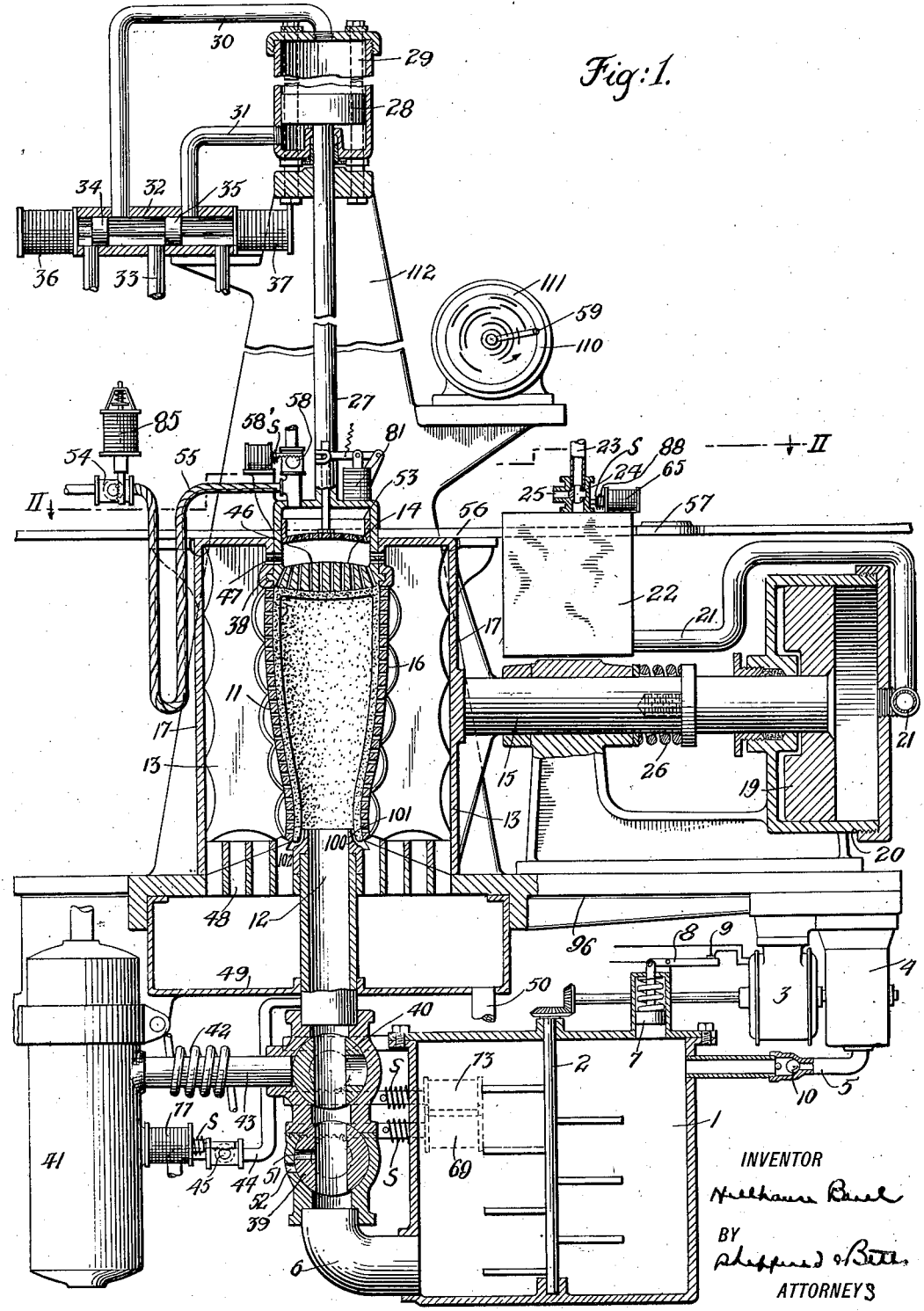
Figure 1 is a vertical section view of the assembled machine.
Figure 2:
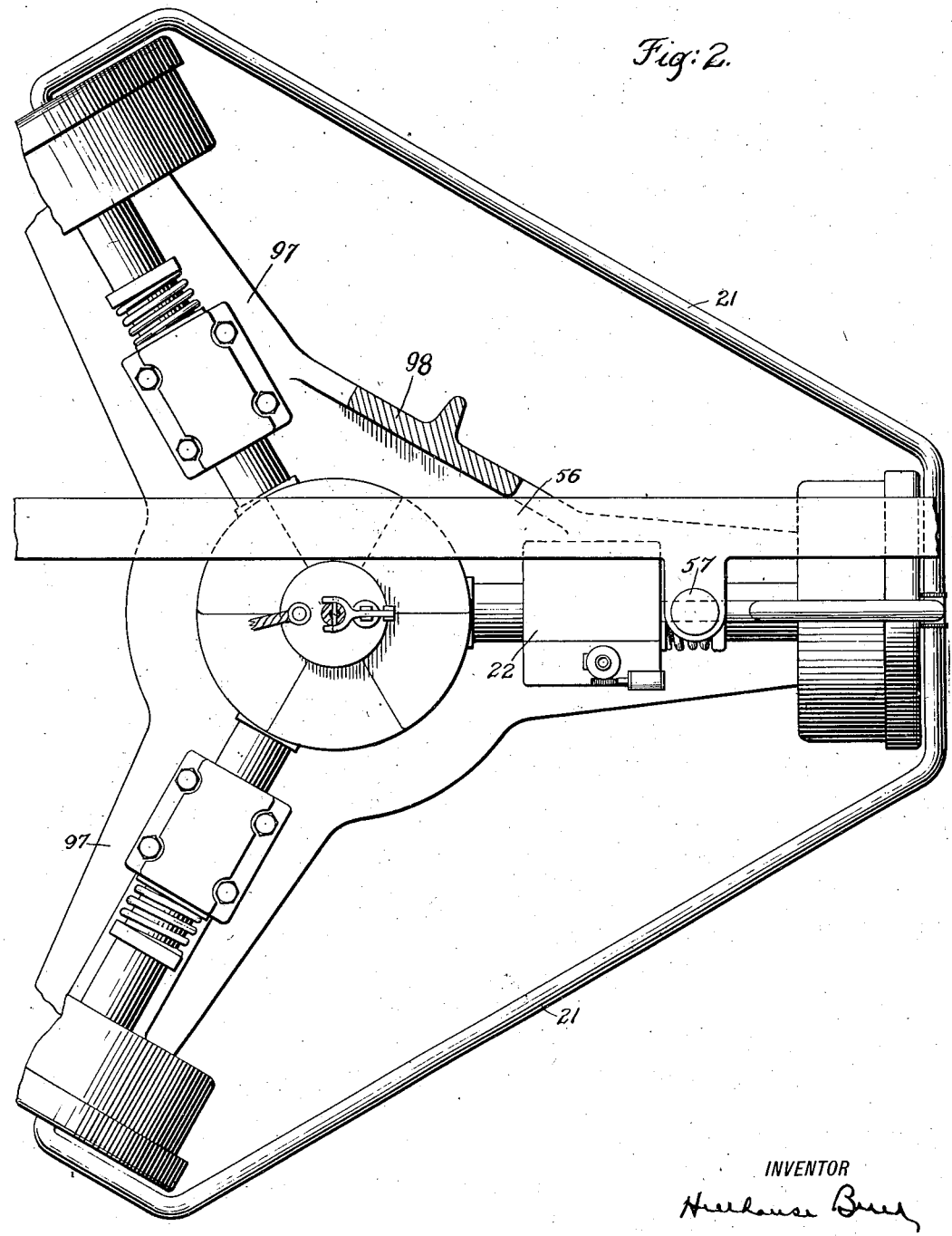
Figure 2 is a transverse section view taken on the line II—II of Figure 1.

Referring in detail to the machine illustrated in the drawings, the reference character 1 designates a tank or reservoir for the pulp to be utilized in the formation of the articles. A rotary beater 2 is disposed in the tank and is driven by means of a motor 3, so as to keep the contents of the tank well mixed at all times. An air compressor 4, preferably also driven by the motor 3, has its delivery or discharge pipe 5 connected with the upper portion of the tank so that the pulp may be forced by air pressure out of the tank and through the conduit 6 into the mold 11.

In order to maintain a substantially uniform pressure within the tank at all times, a spring pressed plunger 7 is disposed in a cylinder in the upper wall of the tank, and is connected to a lever 8, which operates as a switch to register with the contact 9 and start the motor when the pressure falls, and to open the motor circuit and stop the compressor when the pressure in the tank reaches the desired point. A check valve 10 is arranged in the pipe 5 to prevent the flow of air from the tank back to the compressor. When valves 39 and 40 are open to the pulp reservoir, the pulp under pressure in the tank 1 can flow through the conduit 6 into the interior of a mold 11. In the machine illustrated, the article being manufactured is a bottle, and the parts of the mold are constructed so that the mouth of the bottle is directed downwardly over the open upper end, as 12, of the conduit 6.

Figure 4:
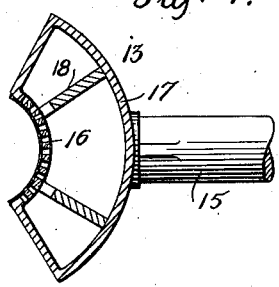
Figure 4 is a horizontal section view of one of the side wall mold sections.

The mold may be constructed in any suitable manner, and the number and shape of parts will vary according to the article to be made, but for bottles and the like preferably comprises three movable side sections, as 13 (see Figure 4) and a movable top section 14. Each of the side sections 13 is mounted on a plunger 15. These sections 13 are formed of an inner wall 16 and an outer wall 17 spaced apart, and with stiffening ribs 18 between them. The inner walls 16 are foraminous, that is to say, they are perforated, and the perforations operate to allow the liquid content of the pulp to flow into the space between the walls of the sections. The inner walls are preferably lined on their inner surface with fine woven wire fabric, as shown in Figure 4.

The plungers 15 carry operating heads 19 within cylinders 20. A conduit 21 extends from a reservoir 22 to all of the cylinders 20. This reservoir is preferably filled with oil, and when it is desired to force the plungers in and close the mold, compressed air is forced into the upper portion of the tank 22 through a conduit 23 which is controlled by a three-way valve 24. When the valve is in the position illustrated in Figure 1, the compressed air flows through the conduit 23 into the tank, forcing the oil downwardly and through the conduit 21 to force all of the plungers out and to close the mold sections. By rotating the valve 24 a one-quarter turn in a clockwise direction, however, to close the conduit 23, the tank 22 will at the same time be opened to the atmosphere through a port 25, and the oil or fluid in the cylinders relieved of pressure. Springs 26, operating upon the plungers 15, will then be free to open the mold by moving the plungers outwardly, forcing the fluid from the cylinders 20 back to the tank, the air of the tank meanwhile escaping freely through the port 25.

The top mold section 14 (for forming or shaping the bottom of the bottle), is mounted on the lower end of the plunger 27, the upper end of which terminates in the head 28 slidable within the cylinder 29. Compressed air supply pipes 30 and 31 communicate with the cylinder 29 above and below the head 28 for supplying the necessary air for moving the head up and down. The pipes 30 and 31 extend to a valve chamber 32 and may be selectively placed in communication with a supply pipe 33 for compressed air by the movement of a pair of slide valves 34 and 35 within the casing. Opposed solenoid magnets 36 and 37 control the movement of the slide valves.

The mold section 14 preferably has a flange 38 formed thereon for interlocking with suitable grooves formed in the side wall sections when the mold is closed.

The valve 40, above referred to, is arranged in the conduit 6 between the valve 39 and the mold, and is adapted to control the supply, into the mold, of both pulp and compressed air. If desired, the air from the tank 41 may be heated as by means of a coil 42 surrounding a pipe 43, which communicates from the tank 41 to the valve 40.

A pipe 44 opens into the conduit 6 preferably between the valve 40 and the mold, for supplying sizing or coating material, such as liquid paraffin, into the mold. The delivery of material through this pipe is controlled by a valve 45 operated by the electromagnet 77.

Figure 3:
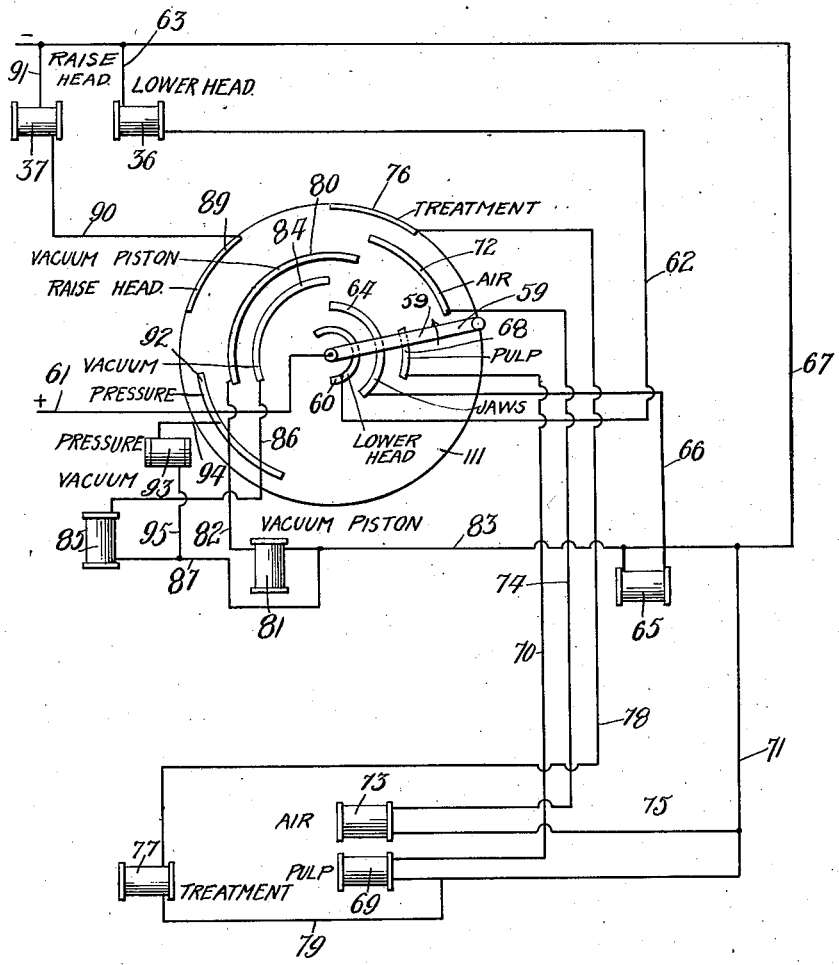
Figure 3 is a diagrammatic view illustrating the controller or automatic switch, and the necessary wiring for the various electrical elements forming a part of the machine.

The operation of the various valves referred to above, is controlled by electromagnets brought into operation at the desired times by controlling mechanism shown in Figure 3, which I will later describe.

Figure 5:
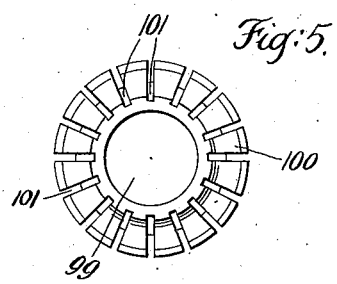
Figure 5 is an enlarged detail view of the mold mouth section.

Assuming the mold to be closed, the operation of the machine is as follows: The valves 39 and 40 are opened, so that the pulp flows from the tank 1 into the mold under superatmospheric pressure. A portion of the fluid in the pulp will be forced outwardly through the perforations in the side walls 16 of the mold, and through the perforations, as 46, formed in the top wall 14 of the mold, and also through the slots 101 in the mouth piece, better shown in Figure 5. The water from the perforations 46 will pass through openings 47 into the space between the inner and outer walls 16 and 17 of the mold sections, and the water from all of the perforations will fall downwardly through the grating 48 into the tank 49, from whence it flows off through a pipe 50.

After a suitable quantity of the pulp has entered the mold to form the bottle, then the valve 39 is rotated a one-quarter turn in a clockwise direction, thus closing the conduit 6, and at the same time the valve 40 is rotated a one-quarter turn in a contra-clockwise direction to open communication between the compressed air tank 41 and the mold. The compressed air, acting upon the pulp within the mold, will compact the pulp and force out any remaining water. The drying action of the air will be hastened if the air be heated as above described.

In the preferred mode of operation, the heated air through the conduit 43 is supplied for a sufficient time to substantially dry the pulp, and then, while the air is still being supplied, the valve 45 is opened by magnet 77 to admit the sizing or coating composition through the pipe 44. This material is taken up and carried along by the air and distributed over the surface of the bottle. These coating or treating valves and conduits may in number correspond to the treatment material used. The valve 45 is then closed, and the valve 40 is returned to its original position, cutting off the flow of air from the tank 41.

The valve 39 is so constructed that when operated to close the conduit 6, it opens communication between the upper part of the conduit and the atmosphere through openings 51 and 52. Thus, as soon as the valve 40 is returned to its original position, the air pressure within the mold is immediately relieved through the openings 51 and 52.

With the application of the coating composition the bottle is completed, and in order now to remove it from the mold, the valve 23 is operated to relieve the air pressure from the tank 22, so that the side wall sections immediately separate under the influence of the springs 26, leaving the sides of the bottle free.

At or about this time the piston 53, which also serves as a slide valve, is brought in motion by magnet 81, and moves downwardly in the top section 14 of the mold and closes the openings 47. A valve 54 is then opened by magnet 85, and suction is applied to the interior of the mold section 14 through a flexible tubing 55, causing the bottle to adhere tightly to the under surface of the mold section 14.

Thereafter the slide valves 34—35 are operated by magnet 37 to supply pressure beneath the operating head 28 of the plunger 27, thus causing the mold section 14, with the bottle still adhering thereto, to be lifted out from the space between the mold side sections and into a position to be deposited upon a moving belt 56, which is arranged above the mold.

The belt 56 preferably is geared to and driven with the controller 59 and is formed with lateral extensions 57 spaced apart along its length, and the movement thereof is so timed, with respect to the operation of the other elements of the device, that one of the extensions 57 will stand in position beneath the lower end of the bottle just after the bottle has reached its uppermost position. When the extension 57 reaches this position, the suction within the mold section 14 is relieved by closing the valve 54 and opening the valve 58 by magnet 58' to the atmosphere, and the bottle thereupon drops from the mold section 14 and travels away on the belt.

It will be noted from the foregoing description that the various valves, forming a part of and which control the operation of the machine, are operated by electromagnets, and these magnets in turn are all controlled by a controller 110. This controller consists of an arm 59 adapted to rotate in contact with contact segments formed and suitably spaced on the surface of the disc 111. The operation of this controller is as follows:

In beginning a cycle of operations to make a bottle, the arm 59 stands in engagement with a contact 60 maintaining a circuit for the magnet 36 from a source along wire 61, arm 59, wire 62, magnet 36, wire 63 back to source. This energizes the magnet 36 and maintains the top section, or head, in its lowered position. The arm 59 also rests on the contact 64, thus maintaining a circuit for the magnet 65 from the source along wire 61, arm 59, wire 66, magnet 65, wire 67, back to source. This energizes the magnet 65 and maintains the valve 24 in position to supply air into the tank 22, thus holding the mold closed.

As the arm 59 rotates in the direction indicated by the arrow, it first engages a contact 68 and closes a circuit for the magnet 69 from the source along wire 61, arm 59, wire 70, magnet 69, wires 71 and 67, back to the other side of the line. The magnet 69, being energized, opens the pulp supply valve 39.

The arm 59 next leaves the contact 68 and valve 39 is closed by spring pressure, thus cutting off the supply of pulp, and about the same time it engages a contact 72 and closes a circuit for the magnet 73 from the source along wire 61, arm 59, contact 72, wire 74, magnet 73, wires 75, 71, 67, back to source. This moves the valve 40 into a position to admit air pressure into the mold from the tank 41.

While the arm 59 is still in engagement with the contact 72, it also engages contact 76, thus closing a circuit for the magnet 77 from the source along wire 61, arm 59, contact 76, wire 78, magnet 77, wires 79, 71, 67, back to source. This moves the valve 45 into a position to admit treating material into the mold from pipe 44.

Further movement of the arm 59 brings it into engagement with a contact 80, thus closing a circuit for the magnet 81 from the source along wire 61, arm 59, contact 80, wire 82, magnet 81, wires 83, 67 back to source. This energizes the magnet 81 and moves the slide valve 53 to close the openings 47.

Thereafter the arm 59 in its continued rotation, engages a contact 84 which closes a circuit for the magnet 85 from the source along wire 61, arm 59, contact 84, wire 86, magnet 85, wires 87, 83, 67 back to source. This operates the valve 54 to apply suction within the top section, or head, 14 of the mold.

The arm 59 leaves the contacts 72 and 76, cutting off the air pressure, and the supply of treating material to the mold, at about the same time that it makes engagement with the contact 84. At about the same time it leaves the contact 64, thus allowing the springs 88 to operate the valves 24, thus permitting the springs 26 to open the mold.

After the mold has opened the arm 59 moves into engagement with a contact 89, closing a circuit for the magnet 37 from the source along wire 61, arm 59, contact 89, wire 90, magnet 37, wire 91, back to source. This allows air under pressure to flow into the pipe 31 and to raise the head of the mold with the finished bottle adhering thereto.

Thereafter the arm 59 engages the contact 92 and closes a circuit for the magnet 93 from the source along wire 61, arm 59, contact 92, wire 94, magnet 93, wires 95, 87, 83, 67, back to source. This relieves the vacuum within the head of the mold and permits the bottle to be deposited upon the moving belt, the suction within the head having been previously released by movement of the arm 59 off of the contact 89.

It will be understood that the valve 58 may supply air under pressure above atmospheric, if desired, so as to force the finished bottle away from the bottom surface of the mold head.

All of the parts of my improved machine are of simple construction and lend themselves readily to mounting upon a simple but very substantial frame, as 96, the side wall sections of the mold being slidably mounted upon radial arms, as 97 of said frame, and the top wall section, or head, of the mold being carried by a pedestal 112.

All of the electromagnets above referred to, except those shown at 36 and 37, are of the single acting solenoid type and operate when energized to move the valves to which they are connected, in one direction. When they are de-energized, coil springs S, illustrated in connection with each magnet, operate to restore the valves to normal condition.

The pulp employed in my machine may be formed of fibre, or finely ground minerals, or similar materials, used singly or in combination with each other, and held in suspension in any suitable fluid.

The process described in this application, of forming products from pulpy mass by forcing the pulpy mass into molds having foraminous walls under super-atmospheric, or super-normal pressure, I believe to be new with me, and the same is described in detail and is claimed in my co-pending application Serial No. 195,726. This application is a continuation, as to certain features, of my prior application, Serial No. 115,086, filed August, 1916, and now abandoned.

While I have described only one embodiment of my invention, I am aware that modifications may be made by those skilled in the art, and I desire protection for all such modifications as come within the scope of my claims.

What I claim is:

1. In a machine of the kind described in combination, means for maintaining a supply of pulp containing liquid under super-atmospheric pressure, a normally closed mold, a conduit connecting said means and said mold, a valve in said conduit between said means and mold, means for operating said valve to cut off said mold from said means, and means for introducing anhydrous fluid at a point between said valve and mold to force liquid through the mold which was trapped in the mold by the operation of said valve.

2. In a machine of the kind described, a mold formed of foraminous movable top and side sections, said top section being hollow and having apertures leading into its interior, means for forcing pulp into the mold, thereby forming an article of the desired shape, in combination with means operating to first withdraw the side sections of the mold, then to seal the apertures in the top section, then to raise the top section with the finished article adhering thereto, all for the purpose described.

3. In a machine of the kind described, a source of compressed air, a plurality of plungers operated thereby, valves controlling the supply of air to said plungers, electromagnets controlling the supply of air to said plungers, and a single control element operated to successively bring said magnets into operation, all for the purpose described.

4. In a machine of the kind described, a mold, a supply conduit leading thereto, a plurality of valves disposed in said conduit, electromagnets arranged to operate said valves, and a single controller connected to and adapted to bring said magnets into operation successively and at predetermined times in the cycle of operation of the machine.

5. In a machine of the kind described, a mold having a movable foraminous top section, means forming a chamber on the opposite side of said section from the mold face thereof, said chamber having outlet ports, means within said chamber for closing said ports, and means for producing a partial vacuum in said chamber when said section is to be moved.

6. In a machine of the kind described, a plunger, a mold section mounted on said plunger, a spring normally tending to retract said plunger, and a fluid operated head on said plunger operating to force the plunger in and to carry the mold section into operative position, and an electromagnet adapted to control the supply of fluid for operating the plunger.

7. In a machine of the kind described, a vertically movable foraminous top mold section having a chamber therein, and means for periodically maintaining suction on said section during a part of the period that the section is lifted from casting position, said means including a part movable within said chamber.

8. In a machine of the kind described, a vertically movable top mold section, means forming a chamber above said section, said chamber having outlet ports, a perforated plunger movable in said chamber and being arranged to close said ports when in one position, the perforations in said plunger being open when said outlet ports are closed, and means for forming a partial vacuum in said chamber at least a part of the time said outlet ports are closed.

9. In a machine of the kind described, a mold comprising foraminous movable side and top sections and a fixed bottom section having slots formed therein to permit withdrawal of liquid from the pulp deposited thereon.

10. In a machine of the kind described, a mold, means for casting an article therein, means for opening the mold, means for raising the finished product and a belt conveyor having projections adapted to pass under the product when the latter is elevated, and to receive and convey the same away from the machine.

HILLHOUSE BUEL.